United States Patent

[11] 3,585,467

| [72] | Inventors | Raynor Linzey<br>Stamford, Vt.;<br>Paul H. Netherwood, Williamstown, Mass.;<br>Herbert C. Craig, Stamford, Vt.; Andrew<br>E. Dequasie, North Adams, Mass. |
|---|---|---|
| [21] | Appl. No. | 849,097 |
| [22] | Filed | Aug. 11, 1969 |
| [45] | Patented | June 15, 1971 |
| [73] | Assignee | Spraque Electric Company<br>North Adams, Mass. |

[54] CAPACITOR WITH MICROSTIPPLED DIELECTRIC
5 Claims, 4 Drawing Figs.

| [52] | U.S. Cl. | 317/258, 317/260 |
|---|---|---|
| [51] | Int. Cl. | H01g 3/04, H01g 3/175 |
| [50] | Field of Search | 317/258, 259, 260; 174/25 |

[56] References Cited
UNITED STATES PATENTS

| 3,077,514 | 2/1963 | Kang | 174/25 X |
| 3,340,446 | 8/1967 | Cox | 317/258 |

FOREIGN PATENTS

| 970,037 | 9/1964 | Great Britain | 174/25 |

*Primary Examiner*—E. A. Goldberg
*Attorneys*—Connolly and Hutz, Vincent H. Sweeney, James Paul O'Sullivan and David R. Thornton

ABSTRACT: An electrical capacitor has at least a pair of metal electrodes convolutely wound with and the surfaces thereof separated by at least one synthetic resin dielectric film. The film is a composite of a comparatively smooth substrate having solvent deposited on at least one surface thereof a microstippling arrangement of a resin dielectric. The surface of the composite has a surface roughness equivalent in depth to from 10—40 percent of the thickness of said comparatively smooth film and has a frequency of peaks of from 50—3000 per centimeter. The capacitor is impregnated with a dielectric impregnant which is fluid at least at the time of impregnation.

PATENTED JUN 15 1971    3,585,467

CAPACITOR WITH MICROSTIPPLED DIELECTRIC

BACKGROUND OF THE INVENTION

The present invention relates to electrical capacitors and, more particularly to electrical capacitors characterized by having a high corona starting voltage.

Capacitor dielectric spacers have previously been made of porous cellulosic materials and, of late, resin films either as the sole dielectric or in combination with the porous cellulosic sheets. Organic resin films are, by and large, better dielectrics than paper type dielectrics in that they can withstand higher voltage stresses. Paper-type dielectrics cannot withstand high voltage stresses and they are subject to flaws and defects such as a high concentration of pinholes or conductive particles which lower electrical strength, and have considerably higher dissipation factor or power loss characteristics. While organic resin film dielectrics can be employed to form far smaller capacitors, to obtain units having equivalent capacitance and voltage ratings of larger capacitors employing paper type spacers, the use of organic resin films is not without disadvantages.

During rolling of this kind of a capacitor, air pockets are trapped in between the convolutions of the capacitor, and these pockets, if not displaced by a material of considerably higher dielectric strength, will cause low corona starting voltage and the capacitor units will be subject to early breakdown and short operational life. A common expedient for overcoming this problem is to impregnate the capacitor section with a liquid dielectric so as to displace the air pockets with a material of higher dielectric strength. Thin resin films, however, are subject to a drawback known as "blocking." This condition results from the tendency of the thin resin films to stick together. This blocking condition and the nonporous nature of the resin film, tend to severely inhibit the impregnation of the multilayer film capacitor with a fluid dielectric. The art would be significantly advanced if a means could be provided which not only overcomes the "blocking" condition but provides an adequate reservoir for the fluid dielectric which impregnates the capacitance section.

It is an object of this invention to provide an improved capacitor of substantially increased reliability.

Another object of the invention is to provide an electrical capacitor having a comparatively high corona starting voltage.

It is yet another object of this invention to provide an improved high voltage capacitor having a composite organic resin film dielectric not subject to "blocking."

Still further objects of this invention will become apparent from the following description and claims when considered in conjunction with the accompanying drawing wherein;

FIG. 1 of the drawing is a reproduction of a photograph of the microstippled surface of the dielectric employed herein;

FIG. 2 is another reproduction of a photograph of the microstippled surface of the dielectric employed herein;

FIG. 3 is a side view in section of a portion of the microstippled dielectric employed in the capacitor of the present invention; and FIG. 4 is a side view of a partially uncoiled, convolutely wound, liquid dielectric impregnated capacitor.

SUMMARY OF THE INVENTION

In accordance with the present invention an electrical capacitor has at least a pair of metal electrodes convolutely wound with and the surfaces thereof separated by at least one synthetic resin dielectric film. The film is a composite of a comparatively smooth film having solvent deposited on at least one surface thereof a microstippling arrangement of a resin dielectric. The surface of said composite has a surface roughness equivalent in depth to from 10—40 percent of the thickness of said comparatively smooth film and has a frequency of peaks of from 50—3000 per centimeter. The capacitor is impregnated with a dielectric impregnant which is fluid at least at the time of impregnation. In a more limited embodiment of the invention the solvent-deposited resin dielectric is of the same material as the comparatively smooth resin dielectric film. In another embodiment each electrode of the capacitor is separated by two or more microstippled dielectric films.

BRIEF DESCRIPTION OF THE DRAWING

FIG. 2 is approximately 200 times.

DETAILED DESCRIPTION OF THE INVENTION

By the present invention a comparatively smooth synthetic resin dielectric film has the surface thereof roughened or microstippled by solvent depositing either the same or a different resin on the surface thereof. For example, a thin, smooth film of polypropylene has the surface modified by depositing polypropylene from a solution of polypropylene in an appropriate solvent. By this technique the surface of the composite has microfissures, porosities, valleys, troughs, etc. thereon, which during impregnation permit any air entrapped between adjacent films to escape and permit liquid dielectric to enter into these troughs or valleys. By this means, air voids which have comparatively low dielectric strength, are eliminated and an adequate quantity of the much higher strength dielectric liquid is interspersed between the surfaces of adjacent films.

EXAMPLE

Figure 1:
FIG. 1 of the drawing is a reproduction of a photograph of a portion of a comparatively smooth polypropylene film which has solvent deposited on part of the surface thereof, polypropylene microagglomerates so as to illustrate the microstippling effect of the deposit. In order to better illustrate the microstippling effect of the deposit, the photograph shows three regions: region 10 has no solvent deposited polypropylene on the comparatively smooth polypropylene film; region 12 has a sparse concentration of deposited polypropylene agglomerates; and region 14 has a dense concentration of deposited agglomerates.
Figure 2:
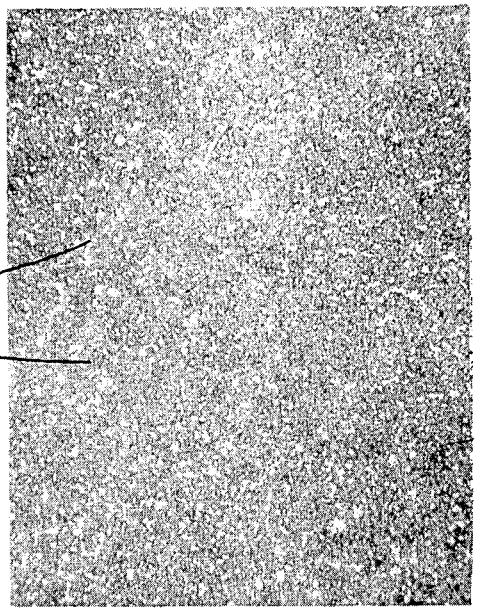
FIG. 2 of the drawing shows a reproduction of a photograph of a section of a typical portion of microstippled dielectric as would be employed in accordance with the present invention. This view illustrates not only the microstippled effect but gives a good indication of the preferred concentration and separation of the individual agglomerates of solvent-deposited polypropylene. The light portions 15 are surface regions of the comparatively smooth film and the dark portions 17 are microagglomerates of deposited polypropylene which produce the microstippled effect. The magnification in both FIG. 1
Figure 3:
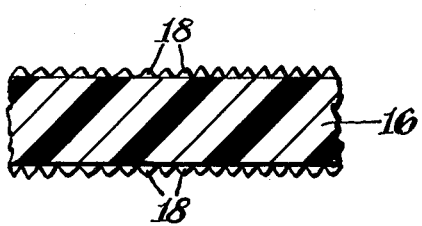
FIG. 3 of the drawing illustrates a side view in section, greatly exaggerated, of a portion of the composite dielectric employed herein. The composite consists of a comparatively smooth synthetic resin dielectric film 16 which has solvent deposited on opposite surfaces thereof a resin dielectric 18 in the form of small agglomerates.

To a quantity of ethyl benzene was added an excess of polypropylene and the combination heated to the boiling point of ethyl benzene. This combination was filtered to remove undissolved polypropylene. The solution was cooled to about 75° C and strips of smooth 0.5 mil 2 wide polypropylene was passed through the solution and the ethyl benzene was evaporated from the surface of the strips in order to solvent-deposit polypropylene onto the surface thereof. The deposited film appeared to the naked eye to be a milky layer which on higher magnification had the appearance shown in FIG. 2 of the drawing. The surface of this composite film was scanned with a Taylor-Hobson "talysurf" using a 2.5 micron diameter stylus. This scan showed that the surface had major depressions equivalent in depth to from about 14 to 18 percent of the thickness of the comparatively smooth film and there was a frequency of peaks of approximately 400 per centimeter.

Figure 4:
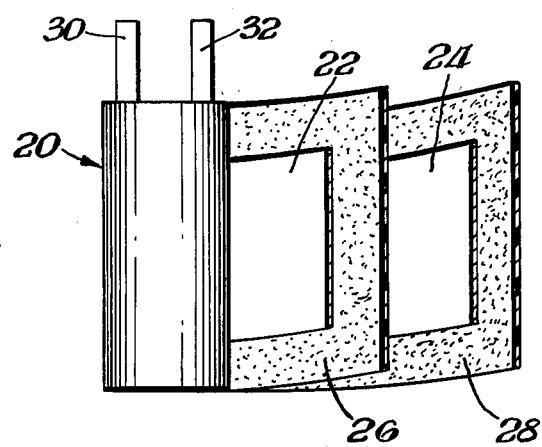
FIG. 4 of the drawing illustrates one type of capacitor which employs the composite dielectric of the present invention. A capacitance section 20 has metal electrodes 22 and 24 separated by composite resin dielectric films 26 and 28. Electrode tabs 30 and 32 are in contact with electrodes 22 and 24. This capacitor is to be impregnated with a dielectric which is liquid at least at the time of impregnation.

A series of 10 capacitor sections are prepared by convolutely winding two strips of aluminum foil separated by two composite films having the above-described characteristics. The aluminum foil is 2 inches wide and 0.25 mils thick. The composite film is 2½ inches wide and approximately 0.6 mils thick. The units are wound in the fashion illustrated in FIG. 4 herein, with electrode tabs in contact with the aluminum electrodes. The capacitors are wound to yield units rated at approximately 2 microfarads each. The capacitors are placed in housings of conventional design each of which are provided with a dielectric fluid, fill-hole. The units are then vacuum impregnated with Clorinal

*Registered Trademark—Sprague Electric Company (a mixture of chlorinated diphenyls containing about 42 percent by weight chlorine) by a conventional technique and the fill-holes are thereafter sealed.

By way of comparison, 10 units identical to the above are formed except no solvent-deposited polypropylene is applied to the polypropylene film. Both series of capacitors are tested for their corona starting voltage. In each instance, the capacitors not employing the composite dielectric of the present invention will be seen to have a considerably lower corona starting voltage than the units of the present invention.

While the specific Example shows the use of a hot saturated solution of polypropylene and ethyl benzene in order to produce the degree of roughness stated therein, It is to be understood that the concentration of polypropylene and the solvent for the polypropylene can be altered in order to produce a surface roughness equivalent in depth to from 10—40 percent of the thickness of the comparatively smooth film and have a frequency of peaks of from 50—3000 per centimeter.

It is also to be understood that the comparatively smooth film and the solvent deposited polymer need not be of the same material. For example, polypropylene or polyethylene can be deposited on other comparatively smooth films such as Mylar, polystyrene, polyethylene, polyimide, polycarbonate, etc. employing for example cyclohexanone as the solvent. Thus, any combination of synthetic solvent-soluble resin capacitor dielectric can be employed as the solvent-deposited portion of the composite and any known prior art organic capacitor dielectric can be employed as the comparatively smooth film of the composite.

As indicated above, the present invention is particularly well-suited for capacitors employing two or more layers or films of dielectric between electrodes. The particular rough surface of the film provides paths between films enabling the impregnant to reach all regions of the wound capacitor. It will be appreciated that the roughening of the surface of the dielectric film is accomplished without weakening the smooth substrate film as occurs in pressure roughening or embossing.

While the specific Example has shown the microstippling of the entire two surfaces of the comparatively smooth film, for some purposes only one side may be microstippled in accordance with the present invention.

Referring once again to FIG. 2 of the drawing, it will be noted that the microstippling appears in a random pattern over the entire surface of the comparatively smooth film. Again, for some purposes, it has been found desirable to apply the microstippling in a pattern, such as by isolated regions of microstippling separated by areas of the film which have no solvent deposited resin dielectric. This can be accomplished by any of the known printing techniques using the solvent solution of the organic resin as the ink material or the solvent solution can be applied in a pattern by using masking techniques.

The technique of the present invention is particularly well suited for capacitors employing polypropylene as the comparatively smooth plastic film dielectric, polypropylene as the solvent deposited microstippling material and a dielectric liquid comprising a halogenated aromatic compound having from 1—5 chlorine substituents and from 1—3 aryl groups. Unlike most impregnants, this class of liquid dielectrics can be taken up by the polypropylene in an amount equal to about 10—12 percent by weight of the liquid. This tends to swell the film, blocking off further access of the liquid to the film. Therefore, all the liquid necessary to displace isolated voids in the form of pockets in the plastic films and between plastic films, must be in close proximity to the voids before swelling blocks access to these sites. The swelling is comparatively slow so that if the dielectric can get to the film, it can diffuse into and through the film and fill the voids. The technique of the present invention provides ample access for sufficient fluid dielectric to reach the surfaces of the plastic film so as to adequately impregnate the unit and fill the voids.

The electrode material employed herein can be any of the commonly employed metal foils, for example, aluminum, tin, lead, silver, etc. The impregnating dielectric liquid can be, in addition to a halogenated aromatic liquid, mineral oil, silicone oil, castor oil, mineral waxes, etc. g,12

It is also to be understood that metallized polymeric dielectric films can be employed in the present invention. This metallization can be a metallization film on the surface of a microstippled composite dielectric of the present invention. This has the advantage of providing a firm adherence of the metallization layer to the surface of the film due to the microirregularities of the surface of the film. Since the metallization film will follow the irregularities of the surface, the microfissures, grooves, depressions, and crevices still will be present in the unit to afford adequate access for the impregnating fluid to enter into a convolutely wound capacitor.

The capacitors of the present invention can be housed in any type prior art container for impregnated capacitors.

Since it is obvious that many changes and modifications can be made in the above-described details without departing from the nature and spirit of the invention, it is to be understood that the invention is not limited to said details except as set forth in the appended claims.

We claim:

1. An electrical capacitor comprising at least a pair of electrodes convolutely wound with and the surfaces thereof separated by at least one synthetic resin dielectric film, said film being a composite of a comparatively smooth film having at least one solvent-deposited microstippled surface of the same resin dielectric so that the surface of said composite has a surface roughness equivalent in depth to from 10—40 percent of the thickness of said comparatively smooth film and has a frequency of peaks of from 50—3000 per centimeter, at least one of said pair of electrodes being a metallization layer deposited over and firmly adherent to said microstippled surface, said layer having substantially the surface irregularities of said microstippled surface, said capacitor being impregnated with a dielectric impregnant which is fluid at least at the time of impregnation.

2. The capacitor of claim 1 wherein said solvent-deposited resin and said smooth film are both polypropylene.

3. The capacitor of claim 1 wherein said solvent-deposited resin dielectric is randomly deposited over at least a majority of the surface of said comparatively smooth film.

4. The capacitor of claim 1 wherein said solvent-deposited resin dielectric is deposited in a pattern so as to provide microstippled areas isolated from one another.

5. The capacitor of claim 1 wherein the other of said pair of electrodes is also a metallization layer having said surface irregularities on another dielectric film having said composite construction.